Nov. 8, 1938.  A. J. SCHWISTER  2,135,679
PIPE CLEANER
Filed Aug. 3, 1937
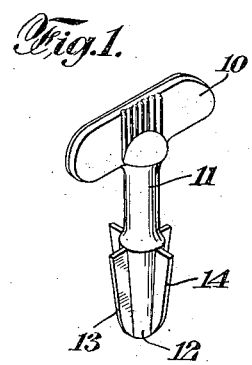
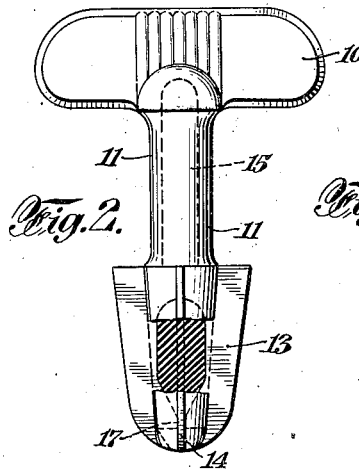
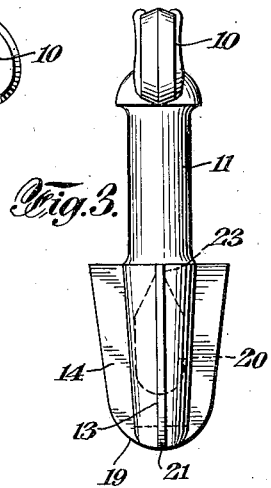
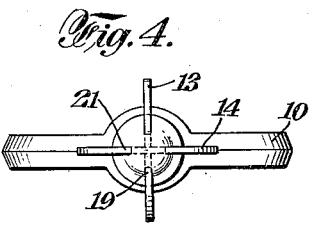
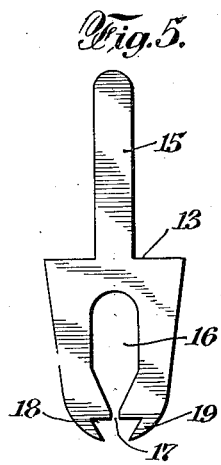
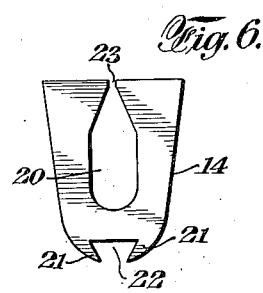
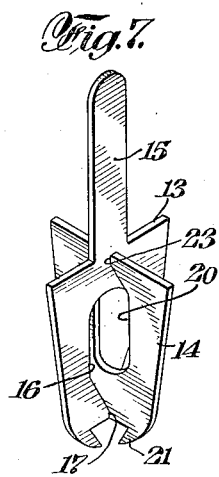
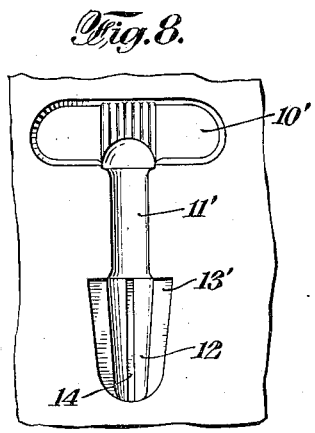
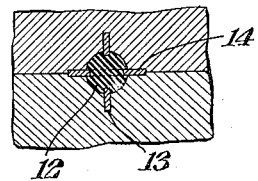
INVENTOR
Anton J. Schwister
BY
Edwards, Bower & Cool
ATTORNEY Patented Nov. 8, 1938

2,135,679

UNITED STATES PATENT OFFICE 2,135,679

PIPE CLEANER

Anton J. Schwister, Greenfield, Mass., assignor to Greenfield Tap and Die Corporation, a corporation of Massachusetts Application August 3, 1937, Serial No. 157,092

2 Claims. (Cl. 131—13)

This invention relates to pipe cutters and particularly to pipe cutters of the type having a series of blades with cutting edges.

The object of the invention is to provide a pipe cutter which will be efficient in action, light in weight and inexpensive in manufacture.

In the accompanying drawing illustrating the invention

Fig. 1 is a perspective view of a pipe cleaner,

Fig. 2 is an enlarged elevational view with parts removed to show the interior construction, Fig. 3 is an elevational view taken at right angle to Fig. 2, Fig. 4 is a plan view of the pipe cutter shown in Fig. 2, Figs. 5 and 6 are face views of the cutting blades, Fig. 7 is a perspective view showing the assembly of the cutting blades, Fig. 8 is a view showing the cutting blades molded in place in the handle material, and Fig. 9 is a sectional view taken on the line 9—9 of Fig. 8.

In the specific embodiment shown the handle 10, shank 11 and head 12 of the pipe cutter are composed of a single integral mass of molded material embedding the inner portions of the interlocked blades 13 and 14 with the outer portions of these blades protruding. These blade members 13 and 14 as shown in Figs. 5 and 6 are stamped from flat metal stock with shapes adapted to slip together to inter-engage and relatively position the blades at right angles to each other, one of the blade members 13 additionally has an upwardly extending tab or shank portion 15 embedded and set within the shank portion 11 of the molded material as indicated in dotted lines in Fig. 2. The blade enlargement of the member 13 has a central recess 16 communicating through the restricted opening 17 with the end recess 18 formed by two inwardly directed end teeth 19. Similarly the blade 14 has a central recess 20 and end teeth 21 providing an end recess 22 but the central recess 20 terminates upward in the reduced space 23.

These blades 13 and 14 are stamped from flat sheet metal and are, therefore, of substantially the same thickness and the spaces 17 and 23 are just slightly larger than the metal thickness so as to snugly engage against the sides of the respective blades when these blades are in assembled position as shown in Fig. 7. The space portion 23 of blade 14 engages the side of the blade 13 with the root of the shank 15 while the space 17 of the blade 13 engages the lower portion of the blade 14 as shown, these engagements holding the blades in right angled relation (Fig. 7).

This blade assembly is positioned in a mold (Figs. 8 and 9) into the hollow of which is pressed or flowed the soft plastic material forming the handle 10, shank 11 and head 12. This material may be either thermoplastic, such as a plasticized pyroxylin, or cellulose acetate molded under heat and hardened by cooling, or it may be material originally plastic when introduced into the mold and hardened by polymerization under heating.

In either event the blades are rigidly held and molded in place in the head 12 with the cutting edges protruding.

The blades, being stamped of sheet steel, are strong and rigid and are interlocked as above described. The recesses 16, 18, 20 and 22 provide cavities for the plastic material to enter and properly lock and firmly hold the blades in position, and the overhanging teeth 19, 21 also interlock with the plastic material to give a firm bond between the parts and extend the metal edges down very close to the tip end of the cutting head.

The punching of the blades provides cutting edges on each blade both forward and rearward so that when set centrally, the cleaner is of the scraper type and by means of forward and backward rotation of the cleaner when in use only a limited amount of the carbon in the pipe bowl is removed, leaving sufficient carbon to insure a cool smoke.

This construction also lends itself to a pleasing, artistic design, and the structure as a whole is much lighter and more convenient to operate than the solid metal type of cleaner.

I claim:

1. A pipe cleaner comprising the combination with a handle, shank and head of light molded material cast and set integrally, of cooperating metal blade members partially embedded in said molded material and inwardly directed curved end portions terminating short of the center of the tool and having their peripheries gradually approaching and entering the curved surface of the molded head portion so as to form therewith gently tapering cutting edge protrusions at the end of the cleaner.

2. A pipe cleaner comprising the combination with a handle, shank and head of light molded material cast and set integrally, of cooperating metal blade members partially embedded in said molded material and comprising one blade having a flat shank passing through the molded shank and a head portion slotted to fit the other blade and recessed to leave a central core, and another blade fitting the slot of the first blade and slotted to receive a portion of the first blade, portions of both of said blades protruding to form the cutting edges of the cleaner.

ANTON J. SCHWISTER.